Dec. 6, 1938.  R. C. RUSSELL  2,139,286
FRICTION BRAKE
Filed Nov. 27, 1936
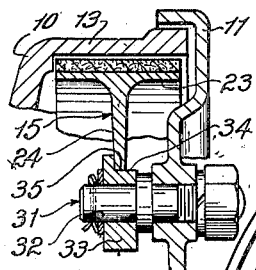
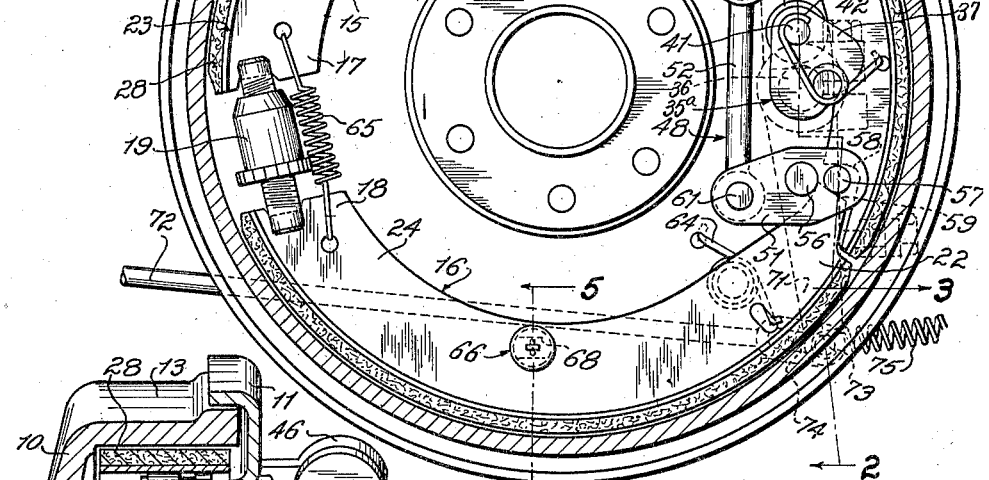
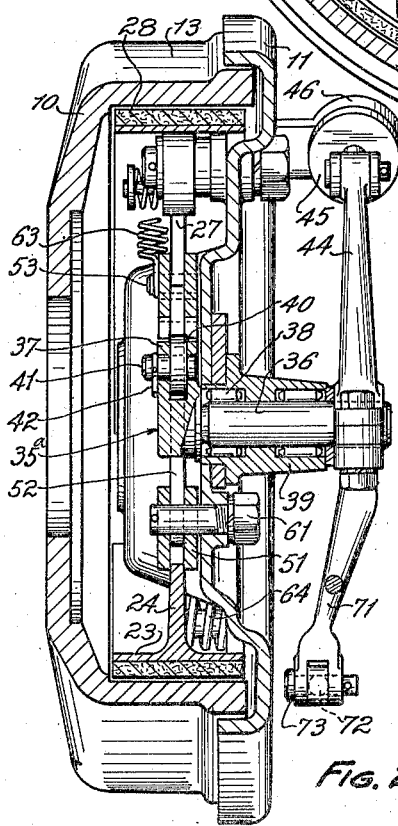
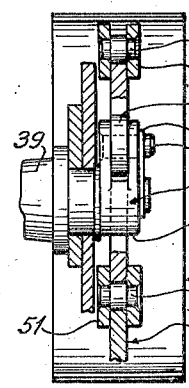
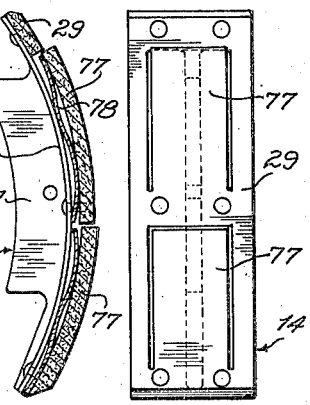
INVENTOR.
ROBERT C. RUSSELL
BY Kwis, Hudson & Kent
ATTORNEY.

Patented Dec. 6, 1938

2,139,286

UNITED STATES PATENT OFFICE 2,139,286

FRICTION BRAKE

Robert C. Russell, Shaker Heights, Ohio, assignor to Eaton Manufacturing Company, Cleveland, Ohio, a corporation of Ohio Application November 27, 1936, Serial No. 113,014

5 Claims. (Cl. 188—78)

This invention relates to friction brakes for vehicle wheels and other uses, and more particularly to an improved internal expanding brake of the type having a friction device and an actuator shoe operable to apply such device against a drum.

An object of my invention is to provide an improved friction brake of the type mentioned, in which novel linkage is employed for operating the actuator shoe.

Another object of my invention is to provide a novel form of anchor adapted to cooperate with a shoe or friction member of a brake in a manner to wedge the adjacent shoe portion toward the drum.

A further object of my invention is to provide an improved friction brake, of the type mentioned, in which the actuator shoe has a cushioned or yielding friction lining adapted to produce a smooth modulated braking action.

Another object of my invention is to provide an improved friction brake of the type mentioned, which operates in a positive and efficient manner without any grabbing effect and in which the pedal travel is substantially independent of the condition of the lining and of the clearance between the drum and the operating shoes.

My invention may be further briefly summarized as consisting in certain novel combinations and arrangements of parts hereinafter described and particularly set out in the appended claims.

In the accompanying sheet of drawings,

Fig. 1 is a sectional view taken through a friction brake embodying my invention.

Fig. 2 is a transverse sectional view taken through the brake as indicated by line 2—2 of Fig. 1.

Fig. 3 is a partial transverse sectional view taken on line 3—3 of Fig. 1.

Fig. 4 is a sectional view taken through the anchor as indicated by line 4—4 of Fig. 1.

Fig. 5 is a similar sectional view taken through a shoe aligning device, as indicated by line 5—5 of Fig. 1.

Fig. 6 is a face view of the actuator shoe, and

Fig. 7 is a longitudinal sectional view taken through the actuator shoe.

The internal expanding friction brake illustrated in this instance represents what I now regard to be a preferred form of my invention, and the following detailed description of my invention is made with reference to this particular brake. However, it should be understood that the invention may be embodied in brakes of various other designs and constructions.

In general, the friction brake illustrated in this instance comprises a rotatable drum 10, a backing plate 11 adjacent thereto and a friction device 12 disposed in the drum for cooperation with the face of its annular flange 13. As will be explained hereinafter, an actuator shoe 14 which is adapted to be shifted by the drum operates to apply the friction device.

The friction device which cooperates with the annular drum flange 13 may be of any suitable type, for example, it may comprise circumferentially aligned operating shoes 15 and 16. These shoes may be loosely supported adjacent the drum surface so as to be capable of limited circumferential shifting and may have their adjacent ends 17 and 18 flexibly connected as by means of the adjustable turnbuckle device 19. The opposite ends 21 and 22 of these shoes are spaced apart to accommodate the actuator shoe 14 therebetween.

Each of the operating shoes may be an elongated arcuate shoe of suitable construction, for example, each shoe may be of substantially T-shaped cross section having a flange portion 23, which forms the top of the T-section and a web portion 24 which forms the stem of the T-section. The actuator shoe may also be of substantially T-shaped cross section having flange and web portions 26 and 27 which form, respectively, the top and stem portions of the T-section. The operating shoes 15 and 16 are each provided with a section of brake lining 28 of suitable characteristic, which is secured to the outer face of the flange portion 23 for frictional cooperation with the annular drum surface.

The actuator shoe 14 is also provided with friction lining 29 which, as will be explained hereinafter, may have novel characteristics providing for the attainment of a modulated braking action.

An anchor or abutment device 31 carried by the backing plate 11 cooperates with the end 21 of the shoe 15 for taking the main braking reaction and limiting the circumferential shifting of the friction device in a clockwise direction. This anchor device may comprise a stud 32 which extends inwardly from the backing plate and carries a washer-like member 33 having a beveled face 34 against which a correspondingly beveled or inclined face 35 of the shoe end 21 engages. The member 33 is rotatable on the stud 32 so that this member may accommodate itself to the inclined face 35 during shifting of the shoe 15.

The actuator shoe 14 is carried by an operating member 35ª and is adapted to be pressed against the drum surface thereby. This operating member may have shaft and lever portions 36 and 37 and may be supported from the backing plate by having the shaft portion journaled in bearings 38 of the bearing bracket 39. The lever portion 37 has a slot therein which receives the web portion 27 of the actuator shoe and has a roller 40 disposed in the slot and engaged by the inner edge of the actuator shoe web. The roller may be journaled on a pin 41 and the web of the actuator shoe may be retained in the slot of the lever portion and in engagement with the roller by means of a torque spring 42 having one end thereof anchored on the pivot pin 41 and its other end anchored on the actuator shoe. It will be seen from the arrangement just described that by oscillation of the shaft portion 36 of the actuating member 35ª, the actuator shoe 14 may be pressed against the drum surface and that by reason of the operating connection between this member and the actuator shoe this shoe is capable of floating or shifting with the rotating drum.

Any suitable form of operating connection may be provided for imparting oscillating movement to the operating member 35ª, for example, a lever 44 may be keyed or otherwise connected to the shaft portion 36 and may be connected with a driver-controlled member such as a lever or pedal by means of a rod or a fluid transmission. In this instance I show the lever 44 as having operative connection with the piston 45 of a fluid pressure responsive cylinder 46. As is usual in wheel brakes, this cylinder may be connected with a pedal operated fluid pressure creating device by means of a pipe or conduit, so that when the operator depresses the brake pedal of the vehicle the piston 45 will be moved to swing the lever 44 in a clockwise direction to thereby press the actuator shoe against the drum surface.

During ahead braking the drum 10 rotates in the direction indicated by the arrow 47, and when the actuator shoe 14 is pressed against the drum surface in the manner just explained, it tends to travel with the drum and this movement is utilized in applying the operating shoes 15 and 16. In utilizing this movement of the actuator shoe I provide linkage 48 for transmitting brake applying motion or force to the end 22 of the friction device during both ahead and reverse braking. This linkage comprises a pair of levers 50 and 51 and a connecting link 52 extending therebetween.

The lever 50 has the inner end thereof mounted on a pivot pin 53 which is carried by the backing plate and extends outwardly from the pivot pin toward the drum flange 13. Adjacent its outer end the lever 50 is provided with a contact portion, preferably in the form of a transverse pin 54, which engages an abutment face 55 formed on the end of the web portion 27 of the actuator shoe. The lever 50 is preferably formed by a pair of spaced plates so that a slot-like opening is available between these plates to receive a portion of the web of the actuator shoe.

The lever 51 is of similar construction to the lever 50, that is, it is formed of spaced plates providing a slot-like recess into which end portions of the webs of the actuator shoe 14 and the operating shoe 16 may extend. The lever 51 is pivoted at an intermediate point thereof on a pivot pin 56 which is carried by the backing plate 11. The outer end of this lever carries a contact member, preferably in the form of a transverse pin 57, which is adapted to be engaged by faces 58 and 59 of the adjacent web portions of the actuator and operating shoes 14 and 16.

The ends of the connecting link 52 extend into the slot-like recesses of the levers 50 and 51 for pivotal connection, respectively, with these levers. One end of the link is pivotally connected with the lever 50 at an intermediate point thereof by means of the pivot pin 60, and the other end of the link is connected with the inner end of the lever 51 by means of the pivot pin 61.

With the arrangement just described it will be seen that when the actuator shoe 14 is shifted in a counter-clockwise direction by the drum during ahead braking, the face 55 of the actuator shoe will act on the pin 54 to swing the lever 50 on its pivot and thereby transmit a pulling force through the link 52 to the lever 51. This pulling force acts to swing the lever 51 on its pivot 56 in a direction to cause the pin 57 to push against the face 59 of the operating shoe 16. This transmitted force causes the operating shoe 16 to be pressed against the drum surface. A part of the force applied to the shoe end 22 is transmitted through the connecting device 19 to the shoe 15 to press the latter against the drum surface. An important function to be noted at this point is that the force acting on the shoe end 22 is acting opposite to the direction of drum rotation and that, during the time that the shoes 15 and 16 are pressed against the drum by this transmitted force, the drum itself tends to produce an unwrapping effect on the friction device, or, in other words, tends to shift the shoes 15 and 16 away from the anchor 31 and in a direction to release the brake.

The torque reaction from this braking operation causes an opposing force to be transmitted back through the linkage 48 and through the actuator shoe to the operating member 35ª. This opposing force requires the application of an increased pressure on the brake pedal by the driver and is desirable because it results in a more positive and satisfactory control over the braking action. The use of a force acting in opposition to the direction of drum rotation for applying the operating shoes 15 and 16 is also highly desirable, because it eliminates grabbing and the excessive braking action resulting therefrom and provides for a quick release of the friction device when the pedal pressure is removed. I also find that since the operating shoes 15 and 16 are applied by the shifting of the actuator shoe rather than by movement of the pedal or driver-controlled member, the clearance between the drum surface and the lining of the operating shoes is relatively unimportant and does not affect or vary the pedal travel required for applying the brake.

The force transmitted to the shoe 15 for applying the same against the drum acts in a direction to cause the cooperating inclined faces 34 and 35 of the anchor device and shoe web to wedge the adjacent shoe end outwardly toward the drum face. The effect of this is to substantially equalize the braking action at both ends of the operating shoe 15.

During the reverse braking the drum 10 rotates in a clockwise direction and the shifting of the actuator shoe by the drum causes the face 58 of the actuator shoe to engage the pin 57 of the lever 51 and press the same against the face 59 of the shoe end 22. Brake applying force is thus applied directly to the shoe end 22 through the pin 57 and causes the shoes 16 and 15 to be pressed against the drum surface. During reverse braking the brake applying force transmitted from the actuator shoe 14 is supplemented by an additional self-energizing action resulting from the tendency of the drum to carry the operating shoes 15 and 16 along with it.

When the brake applying force is released it is desirable to have the operating shoes 15 and 16 shift away from the drum surface, and for this purpose I provide tension springs 63 and 64 which act on the shoes 15 and 16, respectively. The tension spring 63 may have one end thereof anchored on the pivot pin 53 and its other end connected to the shoe 15 at a point such that it will normally act to pull the inclined face 35 of the shoe web toward the inclined face of the anchor device 31. The spring 64 may be a torque spring having one end anchored on the backing plate 11 and its other end connected with the shoe 16 adjacent the end 22 thereof. This latter spring also acts to take up lost motion between the pin 57 and the faces 58 and 59 and between the pin 54 and the face 55.

When the connecting means between the shoe ends 17 and 18 is in the form of the adjustable turnbuckle device 19, it may have slotted ends in which web portions of the operating shoes engage. A tension spring 65 also connects the shoe ends 17 and 18 and holds them in engagement with the slotted ends of the turnbuckle device.

The operating shoes 15 and 16 may be held in circumferential alignment with each other and in centered relation to the drum surface by providing each shoe with a suitable aligning device 66. As shown in Fig. 5, this device includes a pin 67 mounted on the backing plate and extending inwardly through a slotted opening 68 of the shoe web. A compression spring 69 disposed around the pin prevents rattling of the shoe and lightly presses the same against a bearing block 70 carried by the backing plate.

For auxiliary use or emergency application of the brake I may provide the lever 44 with an arm 71 to which an operating rod 72 is connected by means of the pin and slot elements 73 and 74. The operating rod 72 may be connected with a pedal or lever whereby a pulling force may be transmitted to the lever arm 71 to cause application of the brake. A tension spring 75 may be connected to the pin element 73 to take up lost motion and to normally act on the lever 71 in a direction to release the brake.

I have found that in brakes of the type having an actuator shoe a desired modulated braking action can be obtained by varying the characteristics of the actuator shoe lining. As an important feature of my invention I show means for cushioning the lining, or at least a portion of the lining, of the actuator shoe, whereby the desired modulated braking action can be obtained. As shown in Figs. 6 and 7 of the drawing, the lining 29 may have one or more tongue or flap portions 77 which are relatively elevated with respect to the other portions of the lining. When the actuator shoe is pressed against the drum surface these relatively elevated portions of the lining engage the drum surface ahead of the other portions of the lining and are compressed or deflected as the shoe is applied. The area of contact between the lining and the drum surface thus increases as the shoe is being applied and the shifting of the actuator shoe by the drum takes place as a gradually increasing action. The tongue portions 77 of the brake lining may be cushioned by any suitable means, such as leaf springs 78, interposed between the lining and the shoe face. These cushioning springs normally hold the tongue portions in a relatively elevated condition, but yield when these portions of the lining are pressed against the drum surface.

Reverting to the operating connection provided between the actuator shoe and the friction device, it should be explained that the angular relation of the faces 55 and 58 of the actuator shoe and the face 59 of the operating shoe 16 is important, and that by variation of the angular relation of these faces different operating characteristics of the brake can be obtained. In the construction illustrated in Fig. 1, the faces 55 and 58 are substantially parallel to each other and to a radial line of the drum passing through the axis of the shaft portion 36. With these faces in this relation the pins 54 and 57 will readily slide on the faces and will not exert a wedging action tending to pull either end of the actuator shoe away from the drum. The position of the face 59 is preferably such that during reverse braking a component force will be set up in a direction to pull the shoe end 22 inwardly away from the drum surface. In this way the effectiveness of the self-energizing action on the shoes 15 and 16 can be modulated so that a harsh and grabbing braking action is avoided.

From the foregoing description and the accompanying drawing it will now be readily seen that I have provided an improved friction brake of the internal expanding type which is very smooth and efficient in operation and in which a high degree of controllability is obtainable. It will be understood furthermore that in my improved brake the novel operating means for the actuator shoe enables this shoe to perform its function of applying the operating shoes without itself being pulled away from the drum surface. Other important advantages are realized in my improved brake, among which are the equalization of wear and braking force at opposite ends of the actuator shoes and the attainment of a modulated braking action by use of a cushioned or yieldable lining on the actuator shoe.

While I have illustrated and described my improved brake in a somewhat detailed manner, it should be understood, however, that I do not wish to be limited to the precise details of construction and arrangements of parts illustrated and described but regard my invention as including such changes and modifications as do not constitute a departure from the spirit of the invention and the scope of the appended claims.

Having thus described my invention, I claim:

1. In a brake the combination of a rotatable drum, a support adjacent the drum, a friction device extending adjacent a surface of the drum, an actuator shoe adapted to be shifted by the drum, and means for transmitting motion from the actuator shoe to the friction device comprising a pair of levers pivoted on said support and engageable respectively with said shoe and the friction device and a link connecting said levers, said levers being spaced circumferentially of the drum and extending generally radially thereof.

2. In a brake the combination of a rotatable drum, a support adjacent the drum, a friction device extending adjacent a surface of the drum and having spaced ends, and an actuator shoe shiftable to transmit motion directly to one end of the friction device upon rotation of the drum in one direction and to transmit motion through a linkage to the same end of the friction device upon rotation of the drum in the opposite direction, said linkage comprising a pair of levers pivoted on said support and a member connecting said levers.

3. In a brake the combination of a rotatable drum, a support adjacent the drum, a friction device extending adjacent a surface of the drum and having spaced ends, an actuator shoe shiftable to transmit motion directly to one end of the friction device upon rotation of the drum in one direction and to transmit motion through a linkage to the same end of the friction device upon rotation of the drum in the opposite direction, said linkage comprising a pair of levers pivoted on said support and a link having its ends pivotally connected with the levers, one lever being adapted for engagement with said one end of the friction device and the other lever being adapted for engagement with the remote end of the actuator shoe.

4. In a brake the combination of a rotatable drum, a support adjacent the drum, a friction device extending adjacent a surface of the drum and having spaced ends, an actuator shoe shiftable to transmit motion to one end of the friction device by direct engagement therewith upon rotation of the drum in one direction and to transmit motion through a linkage to the same end of the friction device upon rotation of the drum in the opposite direction, said linkage comprising a pair of levers pivoted on said support and a link connected with an end of one lever and with an intermediate part of the other lever, said one lever having an intermediate part thereof pivoted on the support and having its other end adapted for engagement with said one end of the friction device and the other lever having one end thereof pivoted on the support and its other end adapted for engagement with the remote end of the actuator shoe.

5. In a brake the combination of a rotatable drum, a support adjacent the drum, a friction device extending adjacent a surface of the drum and having spaced ends, an actuator shoe shiftable to transmit motion to one end of the friction device by direct engagement therewith upon rotation of the drum in one direction and to transmit motion through a linkage to the same end of the friction device upon rotation of the drum in the opposite direction, said actuator shoe and linkage having cooperating elements adapted to permit relative sliding therebetween substantially radially of the drum while the shoe is transmitting force to the friction device through the linkage.

ROBERT C. RUSSELL.